Patented June 17, 1952

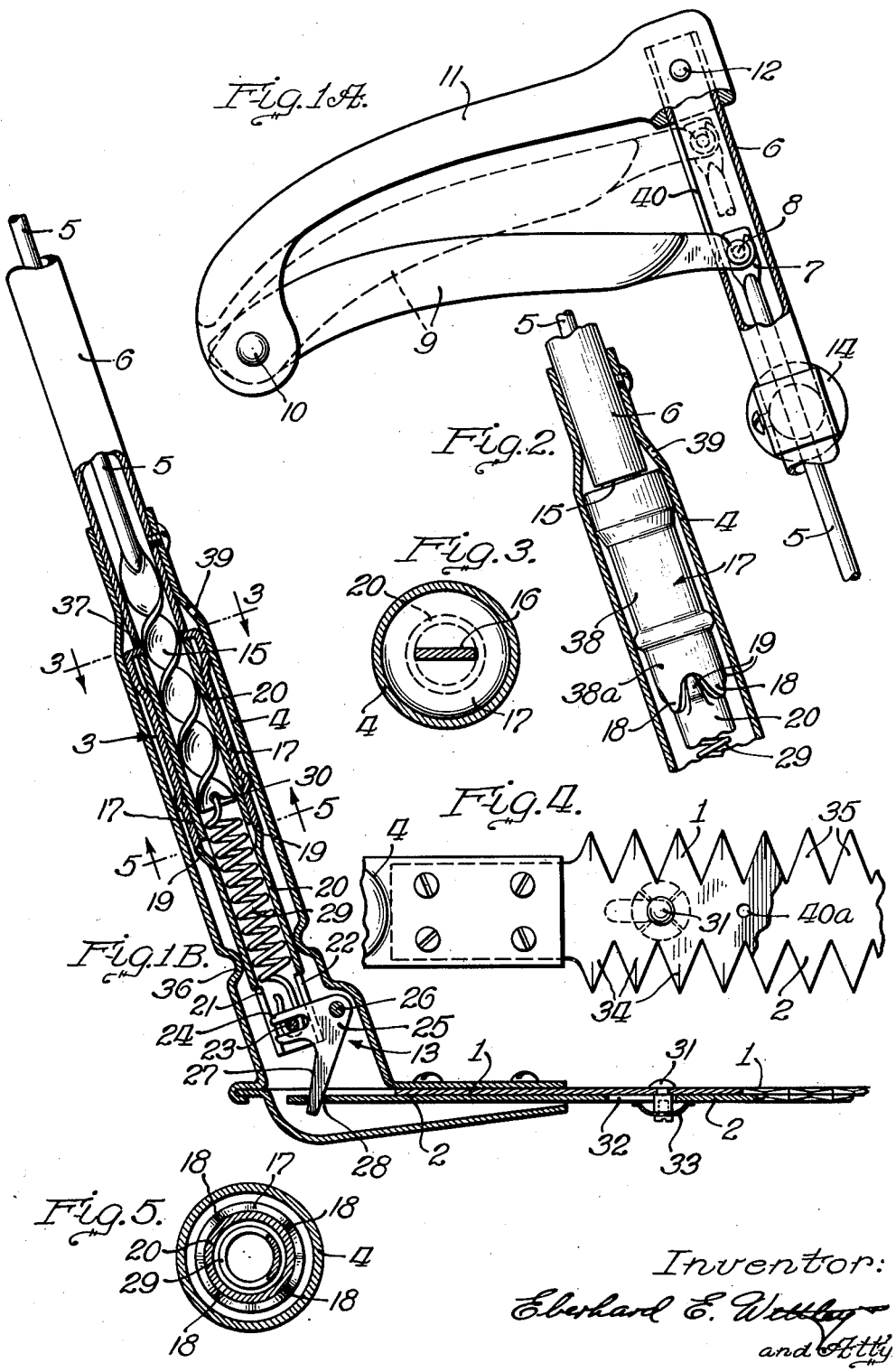

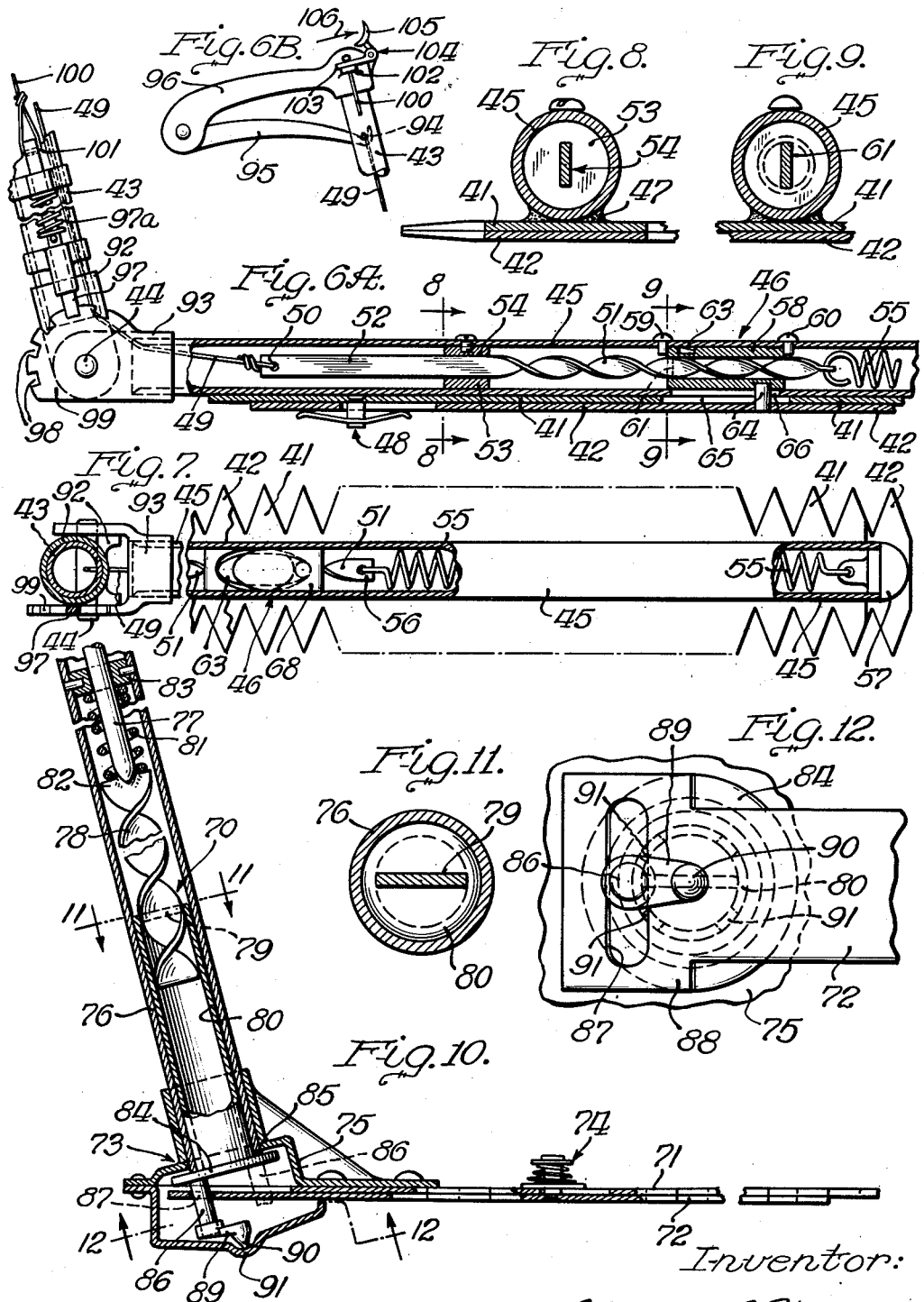

2,601,193

UNITED STATES PATENT OFFICE 2,601,193

CUTTING IMPLEMENT DRIVE MEANS

Eberhard E. Wettley, Chicago, Ill.

Application June 28, 1946, Serial No. 680,149

9 Claims. (Cl. 74—89)

This invention relates to a cutting implement or tool, and more specifically to a trimmer for convenient use in and about a garden to cut away grass, trim hedges and other perennial shrubs, cut weeds, thin out excessive growths, etc., and one of the main objects thereof is to provide a light weight, compact cutting tool at a reasonable cost and one which is capable of free and easy manipulation with a high degree of efficiency.

Another object of the present invention is to provide a cutting tool having mechanism producing continuous rapid cutting action allowing relatively fast bodily movement of the tool, without pause or interruption, over areas being trimmed.

It is a further object of this invention to make a cutting tool of this character having a rapid and continuous cutting action which incorporates a comparatively slow operating mechanism that is well fitted for hand manipulation. This relieves excessive hand strain in operating the cutting tool.

It is another object of this invention to provide a cutter as above set forth which may be provided with a long waist level column or a short column, each including a handle providing hand grip means connected with the actuating mechanism of the cutting blades to operate such mechanism. And as indicated, the operating mechanism is designed to produce a rapid cutting action of the cutting blades through hand operated means requiring relatively slow speed manipulation. By using a slow speed hand grip unit at the end of the column for actuating the operating mechanism, it is therefore, a convenient and efficient arrangement that does not produce hand fatigue and yet obtains a rapid cutting action. Furthermore, the same hand grip means or handle arrangement provides the necessary elements for moving and guiding the tool over and into various areas which are being worked upon by the cutting implement.

The cutting tool, as another feature, may also include adjustable mechanism to permit changing the angular relationship between the operative cutting plane of the cutting blades and the axis of the supporting column or handle structure therefor. This will simplify working under relatively large shrubs or in other remote spots. The blades may, in some instances, be moved substantially in line with the supporting column to reach large bush tops or certain tree branches to trim such growths.

Although several forms of cutting implements are shown and described, such are merely for the purpose of illustrating various applications of the principles set forth under the fundamental generic concept of the invention. It should further be understood that various forms of cutting mechanisms could be operated by the same structures here typified by the examples illustrated. Any coacting cutting means operable by relative movement therebetween may be used and suitably connected with the operating mechanism of this invention which is capable of producing such relative movement in a cutting means. To simplify the disclosure and the description a pair of conventional relatively movable reciprocating cutting blades are illustrated. Such blades are shown as having dual cutting edges to enhance the usefulness of the implement by permitting a back and forth motion much in the manner that a grass whip cutting tool is manipulated, but considerably slower, however, since the action is a progressive cutting action and not a striking action.

All other objects, and advantages and further details relating to other variations in the design and arrangement of the cutting implement of the present invention shall hereinafter appear from the following detailed description referring directly to the disclosures and the drawings forming a part of this specification.

In the drawings:

Figs. 1A and 1B considered together typify a general construction of cutting implement incorporating the principles inherent in the cutting tool of the present invention and illustrate one application of the generic principle involved; certain of the parts thereof being broken away and in section to clearly emphasize some of the details of construction thereof;

Fig. 2 is a fragmentary illustration of a portion of Fig. 1B with certain parts thereof in elevation to more clearly show part of the actuating mechanism of the cutting blades;

Fig. 3 is a transverse cross sectional view taken substantially along the line 3—3 in Fig. 1B;

Fig. 4 is a fragmentary plan view of the cutting blade mechanism of Fig. 1B illustrating a conventional type of blade construction;

Fig. 5 is another transverse cross sectional view taken substantially along the line 5—5 in Fig. 1B;

Fig. 6A is a sectional view of an adjustable construction of cutting implement wherein the actuating elements thereof are somewhat rearranged to be positioned parallel to the cutting blades and immediately adjacent thereto;

Fig. 6B is a side elevational view of the handle end of Fig. 6A to illustrate details of tthe manual parts of the adjustable mechanism;

Fig. 7 is a plan view of the structure illustrated in Fig. 6A with parts thereof broken away and in section;

Fig. 8 is a vertical cross sectional view taken substantially along the line 8—8 in Fig. 6A;

Fig. 9 is another vertical cross sectional view taken substantially along the line 9—9 in Fig. 6A;

Fig. 10 is an axial cross sectional view of a fragmentary portion of a cutting implement illustrating still another modified arrangement thereof but incorporating the same general principles set forth by the present invention;

Fig. 11 is a transverse cross sectional view to illustrate certain structural details as seen substantially in the plane of the line 11—11 in Fig. 10; and Fig. 12 is a fragmentary view further illustrating other details of construction of the Fig. 10 cutting implement and substantially as seen along the plane of the line 12—12 as indicated in Fig. 10.

Referring now to Figs. 1A, 1B, and 2 to 5, inclusive, the cutting implement here shown comprises a pair of coacting cutting blades 1 and 2 of which blade 1 is stationary while blade 2 is reciprocated with respect to blade 1, and an actuating mechanism for operating said blades generally indicated by the reference numeral 3 and confined within a housing 4 to which the stationary blade 1 is secured. An actuator 5 connects with the actuating mechanism 3 and is housed in a waist level column 6 with its upper end 7 pivotally connected at 8 with a handle or hand grip 9 that is pivotally carried at 10 by the waist level handle 11 which is fixedly connected at 12 to the upper end of the waist level column 6.

Relative movement between the handle members 9 and 11 from the full line position in Fig. 1A to the dotted line position therein causes endwise shifting of the actuator 5 operating the actuating mechanism 3 which is connected by means of the motion transmitting mechanism 13 with the movable blade 2 for imparting reciprocation to the latter blade with respect to the fixed blade 1 to obtain the cutting action of the blades. In addition, the handle or hand grip members 9 and 11 form a means for guiding the cutting implement over the areas which are being worked upon and, at the same time, provide means for actuating the blades. In addition, a further handle 14 as indicated in Fig. 1A may be secured in a suitable position upon the waist level tubular column 6 to afford a means which may be held by the other hand as an additional guide means for the cutting tool.

The actuating mechanism 3 of the cutting implement comprises a spiral member 15 forming an integral part of the actuator 5 which passes through a slot 16 as best indicated in Figs. 1B and 3 which is formed in the upper end of the rotatable sleeve 17 that is guided for rotation about the operating axis of the spiral member 15 by means of the walls of the housing 4. As shown in Figs. 2 and 5, the lower end of the rotatable sleeve 17 is provided with cam projections 18 which cooperate directly with cam follower projections 19 formed on the guiding and reciprocating sleeve 20, or otherwise secured thereto, for the purpose of producing a quick reciprocatory action of the sleeve 20 whenever the rotatable sleeve 17 is revolved by the spiral member 15.

The lower end of the reciprocatory guide sleeve 20 is slotted at 21 and 22, and carries a cross pin 23 which engages within the bifurcated leg 24 of a bell crank 25 pivoted at 26 and having its other leg 27 operating within the opening 28 of the movable blade 2, this latter described structure comprising the main elements of the motion transmitting mechanism 13 which reciprocates blade 2 through the described action obtained by the actuating mechanism 3.

Actuator 5 is normally drawn upwardly by a squeeze of the hand upon the hand grip member 9 and 11 and a spring 29 of selected strength and tension is connected at 30 to the spiral 15 and loops about pin 23 of the motion transmitting mechanism 13. This spring 29 furnishes power means for returning the spiral member 15 substantially into the position indicated in Fig. 1B after such member has been raised or moved endwise with respect to the tube 6 by means of the hand grip members 9 and 11 from the full line position to the dotted line position indicated in Fig. 1A. The same spring 29 also performs the dual function of always retracting blade 2 into its extreme left position as shown in Fig. 1 since the spring is looped over the pin 23, and through the action of the bell crank 25 the tension of the spring is transmitted to blade 2 urging the same into the housing 4 of the cutting implement.

There are various ways in which the cutting blades 1 and 2 may be held in operative relation with respect to each other and properly guided to produce an efficient cutting action. One such method is illustrated in Figs. 1B and 4 wherein the stationary blade 1 is provided with a stud 31 projecting through the longitudinal slot 32 in blade 2 which reciprocates relatively to blade 1, and by providing any suitable cup spring washer 33 which bears against the under surface of the blade 2 holding the same in operative contact with blade 1 so that the cutting teeth 34 of blade 1 reciprocate immediately adjacent the cutting teeth 35 of blade 2.

The operation of the cutting implement wherein relatively slow hand action at the hand grips 9 and 11 will produce a rapid relative reciprocation between the cutting blades 1 and 2 is possible through the particular construction hereinbefore described with reference to Figs. 1A, 1B, and Figs. 2 to 5, inclusive. By manipulating the hand grip member 9 and 11 and due to spring 29, the actuator rod 5 is manipulated endwise moving the spiral 15 back and forth within the tube 6, the spiral being partially guided in tube 26 likewise. The actuator 5 is a rod providing a non-rotatable element due to its connection at the pivotal point 8 with the hand grip 9 so that the spiral 15 moves bodily endwise and has no rotation whatever. Upward movement of the spiral 15 is caused by the hand operation described while downward movement is affected by the spring 29.

Endwise movement of the spiral 15 will cause the rotatable sleeve 17 to revolve rapidly in one direction or the other depending upon the direction of movement of the spiral 15, and such motion is capable of quickly reciprocating the sleeve 20 through the action of the cam means 18 and 19 making the pin 23 actuate the bell crank 25 in the same rapid sequence. By rocking such bell crank, motion is directly transmitted to the movable blade 2 by means of leg 27 of the bell crank 25 which engages within opening 28 of the movable blade 2. Sleeve 20 is guided for rotation within the rotating sleeve 17 and also by means of the indented bead 36 formed within the housing 4, and, since the bell crank 25 only moves in a plane at right angles to the axis of the pivot pin 26, the bifurcated end 24 of the bell crank extending through slots 21 and 22 of the guide sleeve 20 holds such sleeve against rotation and only permits reciprocatory movement thereof. The spring 29 at all times holds the sleeve 20 and its cam means 19 in operative engagement with the cam means 18 of the rotatable sleeve 17. Spring 29 is guided and positioned within the reciprocatory guide sleeve 20, which together with all of the other described coacting parts of the operating mechanism 3, produces a very compact and simple arrangement to obtain a rapid reciprocation of the blade 2 by means of a comparatively slow squeezing action between the hand grips 9 and 11.

The relatively movable parts of the actuating mechanism and of the other mechanisms of the cutting implement can be so shaped and designed to eliminate as much friction as possible to further relieve strain upon the hand which manipulates the hand grips 9 and 11. Obviously, the spring 29 through the instrumentality of the pin 23 holds the rotatable sleeve 17 up and against the lower edge 37 of the tube 6 which presents a relatively small frictional area. The rotatable sleeve 17 is also formed with reduced portions 38 and 38a as best seen in Fig. 2, for further reducing rotational friction within the housing 4. As previously described, the reciprocatory sleeve 20 is guided by the housing bead 36 and necessary clearance is provided between this sleeve and the sleeve 17 for the proper functioning of the actuating mechanism. Furthermore, a suitable oil hole such as indicated at 39 in Figs. 1B and 2 is all that is necessary for oiling the entire operating mechanism of the device aside from the handle portion thereof which only includes the pivotal connections 8 and 10 and these can be easily oiled through the slot 40 and from between the two hand grips as is obvious from the disclosure in the drawings. The blades can be oiled through suitable oil holes such as 40a indicated in Fig. 4.

Referring now to Figs. 6A, 6B, 7, 8 and 9, inclusive, the cutting blades are here indicated as 41 and 42. In this construction, the waist level tube is shown at 43 and is pivotally connected at 44 to a horizontally disposed tube 45 which houses the actuating mechanism 46 and carries the cutting blades 41 and 42. In this construction, the blade 41 is soldered, brazed, or otherwise secured as at 47 to the under side of the horizontal tube 45. Suitable spring units such as 48 guide the movable blade 42 with respect to the blade 41 and also hold the blades in operative contact therewith.

In this construction, a similar hand grip means such as shown in Fig. 1A can be employed for actuating a wire or cable 49, or any other suitable flexible non-expandable mechanism can be connected at 50 to one end of the spiral 51. The spiral 51 carries a relatively long flat portion 52 which is not twisted and is guided in a plug 53 having a slot 54 shown in Fig. 8 for preventing rotation of the spiral 51 during the endwise manipulation thereof. While upward movement of the wire 49 causes the spiral 51 to move to the left as seen in Figs. 6A and 7, a spring 55 of suitable size and tension is connected at 56 to the opposite end of the spiral 51 and to the end plug 57 shown in Fig. 7 which closes the outer end of the tube 45 and also holds the adjacent end of the spring as indicated. The spring 55 therefore cooperates with any suitable hand manipulating device for moving wire 49 in the opposite direction with respect to the hand induced tension of the spring through such hand operated device so that the spiral 51 is reciprocated back and forth while it is held against rotation by the plug 53 as explained.

A rotatable sleeve 58 is mounted to revolve within the tube 45 and is held against endwise movement by any suitable means such as pins 59 and 60 shown in Fig. 6A. As indicated in Figs. 6A and 9, one end of the sleeve 58 is provided with a suitable slot 61 through which the spiral 51 passes causing the sleeve 58 to rotate during the endwise manipulation of the spiral 51.

The motion transmitting mechanism in this particular construction comprises a cam groove 63 formed upon the outer surface of the rotatable sleeve 58 which groove 63 is adapted to cooperate directly with a pin 64 that is secured to the reciprocatory blade 42 whereby the back and forth motion of the blade 42 is obtained. The stationary blade 41 is provided with the longitudinal slot 65 to accommodate the pin 64 while the tube 45 has a similar slot 66 for the same purpose. Substantially any amplitude of motion between the stationary and reciprocating blade may be obtained by the proper arrangement and design of the cam slot 63 and sleeve 58 as is apparent from the construction illustrated. And thus, by manipulating the wire 49 in an upward direction to allow spring 55 to return the spiral from the position to which the wire has moved the same, sleeve 58 will be rotated within the horizontal tube 45 of the cutting implement with the cam slot 63 and the pin 64 transmitting such rapid rotary motion of the sleeve 58 into a translated reciprocatory motion through which the blade 42 is operated relatively to the blade 41 to provide the cutting action. Such blades are also actuated at a rapid rate for a relatively slow rate of movement of the spiral 51.

Referring now to Figs. 10, 11 and 12, a construction of cutting implement is here shown which is extremely simple having few operating parts. Its construction also produces rapid relative reciprocation of the cutting blades with respect to each other with a correspondingly slow manipulation of the handle or actuating elements. In the Fig. 10 construction, the actuating mechanism is indicated at 70 for causing a rapid relative movement between the cutting blades 71 and 72 through the motion transmitting mechanism indicated at 73. Blades 71 and 72 are held in cooperative cutting engagement through spring means 74, and blade 71 is connected to the housing 75 which is secured to one end of the waist level tube 76.

An actuator 77 terminates in a spiral 78 which projects through and coacts with a slot 79 in a rotatable sleeve 80 as best shown in Figs. 10 and 11. A suitable expansion spring 81 is interposed between the shouldered portion 82 of the spiral 78 and any suitable stop plug 83 secured to the tube 76. This spring functions to move the spiral 78 downwardly whenever the actuator 77 has been drawn upwardly and released. Thus reciprocation of the spiral 15 in back and forth motion within tube 76 causes rapid reversible rotation of the sleeve 80 within the tube 76. The sleeve 80 is provided with a disc or other suitable means 84 that bears against the end of the tube 76 to prevent displacement of the sleeve 80 upwardly with respect to the tube 76 during upward movement of the actuator 77. This disc 84 carries a crank pin 86 which operates within a lateral slot 87 formed in the housing end 88 of the movable blade 72, so that rotation of sleeve 80 causes rapid reciprocation of the movable blade 72 through the motion transmitting means just described.

Downward displacement of the sleeve 80 and its associated parts is prevented by means of a bearing arm 89 secured to the end of the pin 87. The conical end 90 of the bearing arm 89 seats within a depression 91 in the housing 75 preventing relative endwise movement of the sleeve 80 with respect to the tube 76 at any time during the functioning of spring 81 which normally acts downwardly upon the spiral 78. Obviously, the conical end 90 of the bearing arm 89 reacts at a point which lies on the axial center line of the entire operating mechanism within the tube 76 so that very little friction is encountered at this point during the action of the mechanism and spring 81 since the disc 84 engages a relatively small surface area of the end 85 of the tube 76, the friction at this point is also relatively negligible. The crank action and the manner in which the motion is transmitted to the movable blade 72 from the actuating mechanism 70 is well shown in Fig. 12 and needs no additional explanation. Furthermore, the manner in which the rotatable sleeve 80 is secured to the disc 84 is also optional although in this case such sleeve is indicated as staked at points 91a to the disc 84 as shown in Fig. 12, producing a rigid union of these parts.

Although waist level columnar tubes have been described, it is obvious that short tubular columns can be supplied so that the tools may be used with the hand disposed close to the ground or for hedge trimming purposes. This merely requires a condensation or rearrangement of the general mechanism employed. For the short tube structure, the cutting implement illustrated in Figs. 6A to 9 may be considered most feasible in view of the fact that all of the actuating mechanism is housed in a position directly adjacent the cutting blades instead of within the angularly disposed upwardly extending tube which carries the hand grip members for operating the device.

The general structures of the three forms shown provide a good representation as to how the mechanisms of this invention may be adapted to carry out their individual purposes in making a cutting implement of a versatile nature in contrast to the cutting implements that are now in use. Some of the possible rearrangements of parts have been indicated as they are obvious from the disclosure.

Further, the cutting implements in Figs. 1B and 10 are constructed as rigid units wherein the cutting blades are disposed and operated at a fixed angle with respect to the upwardly extending waist level tubes shown. However, a variation in the angle of the blades with respect to the manipulating column may be desirable, and Figs. 6A and 7 incorporate mechanism to conveniently adjust the cutting plane of the blades with respect to the manipulating column connected therewith. Tubes 43 and 45 are pivotally connected by the pin 44 which passes through the ears of the clevises 92 and 93 respectively. The latter are suitably connected to the adjacent open ends of the tubes 43 and 45 so that the flexible draw wire 49 can easily pass from one tube to the other to pass upwardly through tube 43 and to connect with the end 94 of the movable handle 95 that is pivoted on the fixed handle 96. A spring pressed latch 97 is suitably guided alongside the tube 43 and is capable of engagement within any one of a number of notches 98 formed upon the periphery of one enlarged segmental ear 99 of the clevis 93.

Suitable operating means such as a release wire 100 can be connected with the spring latch 97 at 101 to extend upwardly to the handle end of the tube 43. Here wire 100 passes through a suitable hole in a lug 102 on the handle 96 to be secured to one leg 103 of a pivoted bell crank 104. The other leg 105 is formed to provide a thumb knob for manual manipulation. Leg 103 is normally held against the upper face of lug 102 by the spring 97a of the latch means 97 acting through the wire 100 when the latch is operatively seated in any selected one of the notches 98 of the segmental ear 99. By a movement of the thumb against the knob leg 105 and in the direction of the arrow 106, the adjustable detent mechanism comprising the latch means 97 and ear 99 is released to allow resetting of the operating angle of the cutting blades with the actuating and manipulating column of the cutter. After relative movement of tubes 43 and 45 about pivot pin 44 has properly positioned the tubes, the detent mechanism may again be made effective by a release of the thumb knob 105 of the bell crank 104.

The adjustable mechanism and the operating parts therefor do not interfere with the normal operation of the hand manipulated members 95 and 96 and this mechanism is comparatively simple in construction. Other equivalent detent means may be used in changing the angle between tube 43 and 45 with equal facility, and analogous arrangements might be applied to the other described cutting implements. In the Fig. 6A construction, the slack in the draw wire 100 will at all times be taken up by the spring 55 regardless of the angular relationship between tubes 43 and 45. Such slack will be comparatively negligible however.

It is contemplated that other modifications may be made in the exact structures herein disclosed and described as well as a substitution of equivalent mechanism for performing the same functions as do those mechanisms submitted herewith. All changes and rearrangements of the various mechanisms as well as other combinations of the parts shall be controlled by the scope of the language of the appended claims submitted herewith and directed to the present invention.

What I claim is:

1. An actuating mechanism for operating a movable element, said actuating mechanism comprising coacting spiral and slotted members, motivating means connected with one of said members to cause relative movement between both of said members, and motion transmitting mechanism connected with one of said members and with said movable element to operate the latter.

2. An actuating mechanism for operating a movable unit, said actuating mechanism comprising coacting spiral and slotted members, motivating means connected with one of said members to cause relative movement between both of said members, and motion transmitting mechanism connected between the other of said members and said movable unit to operate the latter, said motion transmitting mechanism comprising a reciprocatory element having cam connection with said other member and including a rockable connection between said reciprocatory element and said movable unit.

3. An actuating mechanism for operating a movable unit, said actuating mechanism comprising coacting spiral and slotted members, manual means connected with one of said members to cause relative motion between both of said members when said manual means is moved in one direction, cooperative means connected to urge said one member in the opposite direction to impart further relative motion between said members, and motion transmitting means connected with the other of said members and with said movable unit and being directly responsive to the motion of said other member to actuate said unit.

4. An actuating mechanism for operating a movable element, said mechanism comprising a bodily movable spiral, a rotatable sleeve having a slot therein for the reception of said spiral whereby bodily motion of said spiral causes rotation of said sleeve, a rockable unit connected with said movable element to operate the latter, and cam means interposed between said rotatable sleeve and rockable unit to motivate the latter during the bodily movable action of said spiral.

5. An actuating mechanism to operate a movable element, said mechanism comprising a bodily movable spiral, a rotatable sleeve having a slot therein for the reception of said spiral whereby bodily motion of said spiral causes rotation of said sleeve, a rockable unit connected with said movable element to operate the latter, and cam means interposed between said rotatable sleeve and rockable unit to motivate the latter during the bodily movable action of said spiral, said spiral including manual means to bodily urge the spiral in one direction, and resilient means connected to urge said spiral in the opposite direction.

6. An actuating mechanism to operate a movable reciprocable element, said mechanism comprising a bodily movable spiral, a rotatable sleeve having a slot therein for the reception of said spiral whereby bodily movement of spiral causes rotation of said sleeve, and motion transmitting mechanism interposed between said sleeve and said movable element to operate the latter, said motion transmitting mechanism including reciprocatory cam means arranged to impart reciprocatory motion to said movable element upon rotation of said slotted sleeve.

7. A device to operate a movable member, said device comprising a housing adapted to carry said member, actuating mechanism carried by said housing and connected for operating said movable member, an extension for said housing, operable means carried by said extension and connected with said actuating mechanism to operate the latter, means connecting said housing and said extension for relative swinging movement, and adjustable coacting detent members interposed between said housing and said extension to selectively vary the relative positions of the housing with respect to the extension.

8. A device to operate a movable member, said device comprising a pair of housings, one of said housings carrying said movable member, actuating mechanism carried by one of said housings and connected for operating said movable member, operable means carried by one of said housings and connected with said actuating mechanism to operate the latter, means connecting said housings for relative swinging movement, and coacting adjustable latch members connected with each of said housings respectively to selectively vary the angular relation between said housings.

9. An actuating mechanism to operate a movable element, said actuating mechanism comprising coacting relatively movable spiral and slotted members, operative means connected with at least one of said members to cause relative movement between said members, and a pin connected with the other of said members for bodily rotation by said member, said pin being adapted for connection with said movable element to transmit motion thereto.

EBERHARD E. WETTLEY.

REFERENCES CITED

The following references are of record in the file of this patent:

UNITED STATES PATENTS

| Number | Name | Date |
|---|---|---|
| 733,919 | Schwartz | July 14, 1903 |
| 873,333 | Sweet | Dec. 10, 1907 |
| 1,594,277 | Stanley | July 27, 1926 |
| 1,681,688 | Simescu | Aug. 21, 1928 |
| 1,857,342 | Albrecht | May 10, 1932 |
| 2,235,326 | Muros | Mar. 18, 1941 |
| 2,301,413 | Kilcup | Nov. 10, 1943 |
| 2,420,825 | Hutton | May 20, 1947 |
| 2,421,455 | Herold | June 3, 1947 |
| 2,421,901 | Murod et al. | June 10, 1947 |